United States Patent [19]

Crandall

[11] Patent Number: 5,436,741
[45] Date of Patent: Jul. 25, 1995

[54] HOLOGRAPHIC SIGNALING MIRROR

[75] Inventor: Robert M. Crandall, Capac, Mich.

[73] Assignee: Harman Automotive, Inc., Farmington, Mich.

[21] Appl. No.: 174,109

[22] Filed: Dec. 28, 1993

[51] Int. Cl.⁶ .......................... G02B 5/32; G02B 5/08; B60Q 1/00; B60R 1/06

[52] U.S. Cl. .................... 359/15; 359/567; 359/839; 359/843; 359/877; 362/83.1; 340/468; 340/475; 340/479

[58] Field of Search ............. 359/15, 567, 581, 584, 359/589, 839, 884, 13, 14, 602, 843, 877; 362/30, 83.1, 135, 290, 296; 340/468, 475, 479

[56] References Cited

U.S. PATENT DOCUMENTS

| | | | |
|---|---|---|---|
| 3,665,392 | 5/1972 | Annas | 362/83.1 |
| 4,066,332 | 1/1978 | Kato et al. | 359/601 |
| 4,158,483 | 6/1979 | Fisher et al. | |
| 4,588,664 | 5/1986 | Fielding et al. | |
| 4,678,295 | 7/1987 | Fisher | |
| 4,882,565 | 11/1989 | Gallmeyer | 362/83.1 |
| 4,916,430 | 4/1990 | Vu et al. | 362/83.1 |
| 5,014,167 | 5/1991 | Roberts | |
| 5,059,015 | 10/1991 | Tran | |
| 5,072,340 | 12/1991 | Jones | |
| 5,109,214 | 4/1992 | Heidman, Jr. | |

Primary Examiner—Ricky D. Shafer
Attorney, Agent, or Firm—Dykema Gossett

[57] ABSTRACT

A signaling mirror assembly for mounting to an exterior of a motor vehicle comprises a mirror shell mounted to a side of the vehicle body and a mirror mounted within the shell having reflectivity of at most 70% and transmissivity of at least 40%. The signaling mirror also has a light source disposed between the mirror and the shell which is operably illuminated in response to operating signals. Also included is diffractive means disposed between the light source and the mirror for diverting light from the vehicle operator to a viewing pattern which generally fans out from the side of the vehicle body.

11 Claims, 3 Drawing Sheets

HOLOGRAPHIC SIGNALING MIRROR

FIELD OF THE INVENTION

This invention is in the field of exterior mounted rearview mirrors for motor vehicles. More specifically, this invention is in the field of vehicle rearview mirrors combined with visual signaling devices such as turn indicators and brake lamps.

BACKGROUND OF THE INVENTION

It is highly desirable to provide vehicles with signaling devices by which drivers of adjacent vehicles can be made aware of another driver's intentions and actions. The desirability of supplementing visual indicator signals provided by vehicle tail lights has manifested itself in a Federal Motor Vehicle Safety Standard requiring cars to have a center high-mounted stop lamp (CHMSL) placed in the rear of the vehicle at a point higher than that normally associated with tail lights.

Additional supplements to the brake signals as well as turn indicators and four-way flashers, are seen as being potentially beneficial as a warning device to operators of adjacent vehicles. One difficulty of providing such a signaling feature, however, is that mounting such a signaling device to the sides of the vehicle would detract from the vehicle's appearance, as well as potentially causing secondary problems such as wind noise. The present invention provides such a signaling device which is concealed within the existing envelope of the vehicle by locating them inside the exterior rearview mirror housings.

U.S. Pat. No. 5,014,167 to Roberts describes a signaling device so concealed. However, it relied on a light baffle to prevent the signaling device from interfering with the driver's use of the mirror. The baffle is an inefficient transmitter of light requiring a relatively high powered light source to produce a signal sufficiently bright to be seen by drivers of adjacent vehicles. The use of a high power light source creates heat distribution problems within the mirror housing. The present invention teaches how to provide a clearly visible signal with a light source of much lower power.

SUMMARY OF THE INVENTION

In one aspect of the present invention, a signaling mirror for mounting to an exterior of a motor vehicle is disclosed comprising a mirror shell mounted to a side of the vehicle body with a semi-transparent mirror mounted therein having at most 70% reflectivity and at least 40% transmissivity. Also included is a light source mounted between the mirror and the shell which is operably illuminated in response to use of vehicle brakes and vehicle turning signals. Diffractive means is disposed between the light source and the mirror, diverting light from the driver to a viewing pattern which generally fans outward from a side of the vehicle body.

The present invention provides an exterior signaling device readily visible to drivers of adjacent vehicles. This signaling device does not interfere with the use of the mirror by the driver in observing traffic conditions around him.

DETAILED DESCRIPTION OF THE PREFERRED EMBODIMENT

Figure 4:
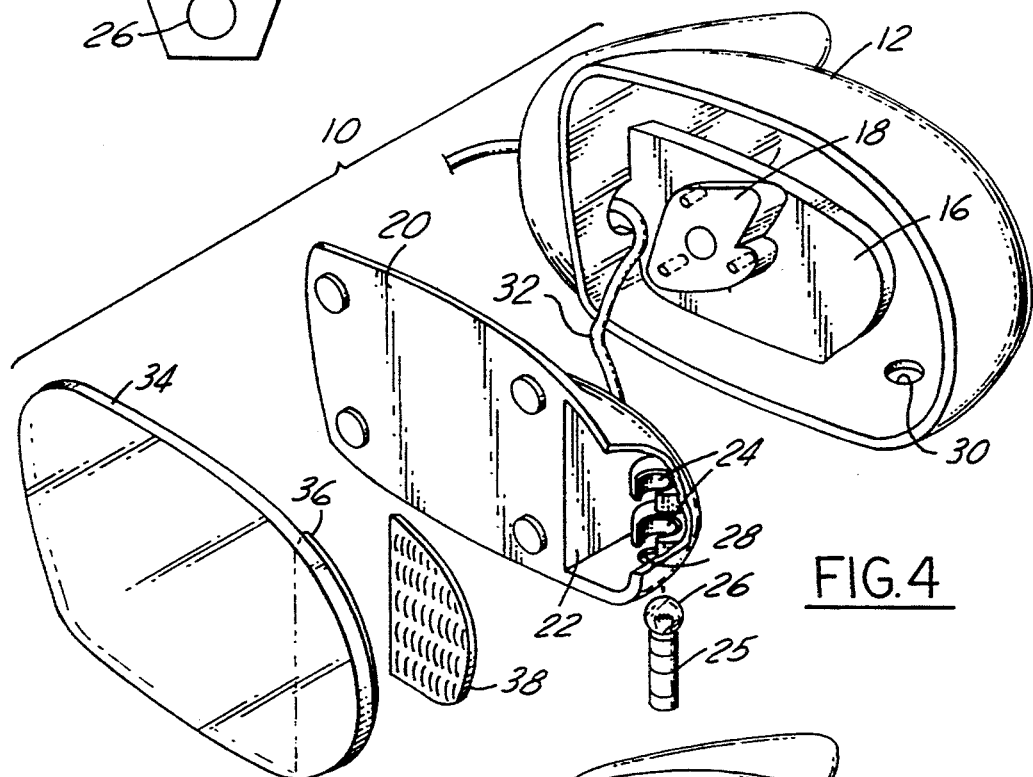
FIG. 4 is an exploded view of a signalling mirror assembly.
Figure 5:
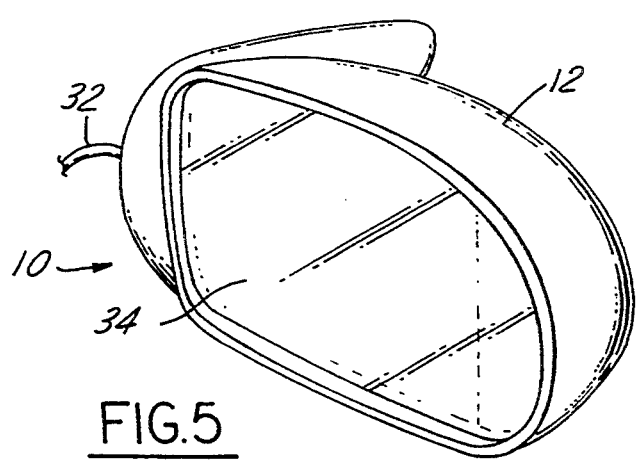
FIG. 5 is a perspective view of the signalling mirror assembly.
Figure 6:
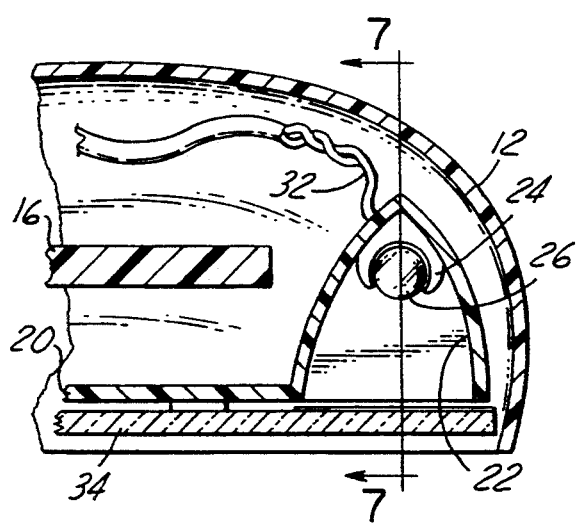
FIG. 6 is a partially sectional view of the signalling mirror assembly from above.
Figure 7:
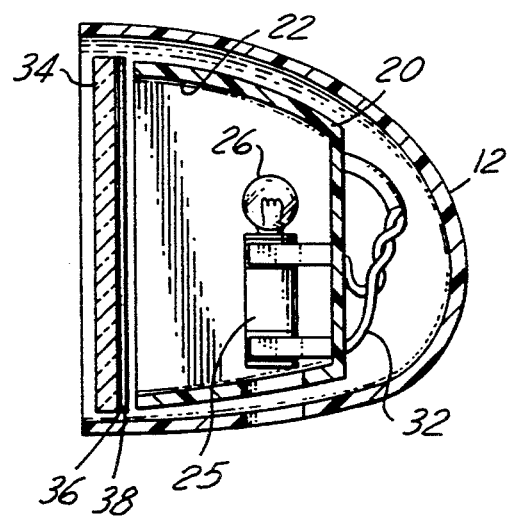
FIG. 7 is a sectional view of the signalling mirror in the direction of arrows 7 in FIG. 6.

A holographic signaling mirror assembly 10 is shown in FIGS. 4 and 5. A mirror shell 12 is fixed to the vehicle body 14 at a sail panel of the vehicle door. Threaded fasteners (not shown) hold the mirror shell in place. A mounting plate 16 is fixed within the mirror shell 12. An electric mirror actuator 18 is mounted on the plate 16. The electric mirror actuator 18 can be any one of several designs well known in the field of electrically operated remote control rearview mirrors. One example of such an electric motor actuator is provided in U.S. Pat. No. 4,158,483 to Fisher, et al. and assigned to the assignee of the present invention. Another example is shown in U.S. Pat. No. 4,678,295 to Fisher.

A glass case 20 is mounted to the electric mirror actuator 18 for pivoting thereby in response to manipulation of a mirror position control switch (not shown) by a vehicle operator, or driver. The glass case 20 is preferably made of plastic to minimize its weight. The glass case 20 has a reflector pocket or light well 22 forming a concave reflective surface and disposed at an outboard edge. The light well 22 may be chrome plated to provide a desired reflectivity.

Disposed within the light well 22 are two sets of bulb clips 24. The bulb clips 24 are configured to retain and electrically contact a cylindrically shaped light bulb retainer 25 with a light bulb 26 disposed therein. Alternatively, cylindrically shaped light bulbs (not shown), such as are commonly employed in motor vehicle dome lamps may be employed.

An access opening 28 is present in a bottom of the light well 22 to accommodate axial insertion of the light bulb 26 into the bulb clips 24. A mirror shell access opening 30 is lined with the reflector packet access opening 28 allowing entry of the bulb 26 therethrough. It is anticipated that the mirror shell access opening 30 would have a plug or cover not shown to prevent the generation of wind noise thereby as well as to prevent the entry of debris therethrough.

The bulb clips are electrically connected in parallel with existing indicators for the brakes, the turn indicators, and the four-way flashers for illumination thereof in response to an input voltage.

The mirror 34 is mounted by conventional means to the glass case 20. The mirror 34 is formed of glass to comply with current regulations, but could be formed of plastic. The mirror glass may have a reflectivity of up to 70%, but preferably has less reflectivity than that. Current federal regulations require at least 55% reflectivity, but lower reflectivities are conceivable. The mirror glass preferably has a transmissivity of approximately 60% of a selected frequency range of the spectrum of visible light but of at least 40% of the selected frequency range. The mirror glass also has a dielectric red zone band pass filter coating 36. Coatings establishing the reflectivity, transmissivity, and filtering characteristics are well known and are commercially available from the Polaroid Corporation of Cambridge, Massachusetts.

A light diffracting and diffusing hologram 38 is adhesively bonded to a surface of the mirror glass disposed toward and covering the reflector packet 22 of the glass case 20. The hologram has the appearance of a thin flexible film. A photopolymerizable composition which may be employed in fabricating the hologram is described in U.S. Pat. No. 4,588,664, assigned to Polaroid Corporation of Cambridge, Mass.

Typically, both left and right exterior mirrors would be equipped with such signal assemblies.

Figure 3:
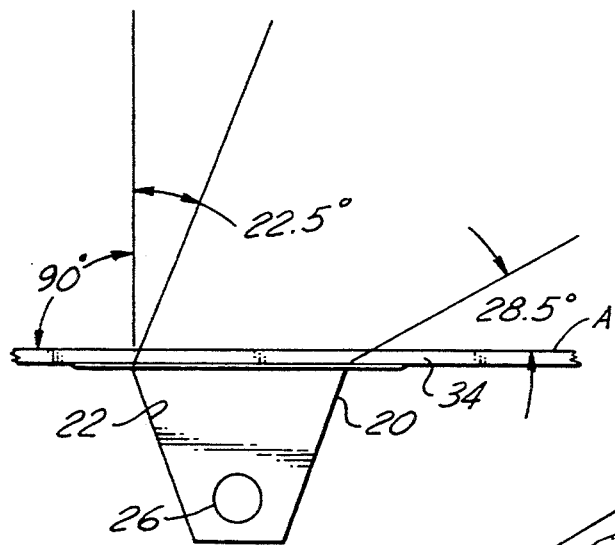
FIG. 3 is a schematic representation of the illumination pattern provided by a single mirror.

The holographic signaling mirror operates in the following fashion. A voltage signal from the brakes, the turn indicator, or four-way flashers is received by the holographic signaling mirror shown in FIGS. 4 and 5. Current passing through the electrical conductors 32 and into the bulb clips 24 passes through the light bulb 26, illuminating the light bulb. Light from the light bulb 26 is reflected rearward by the light well 22 through the light diffracting and diffusing hologram 38. The hologram 38 diverts the light away from the driver's view. As shown in FIG. 3, light leaving a common plane A of the mirror and the hologram is diffracted away from a direction normal to the plane of the hologram. In this particular embodiment, the diffracted light escapes the hologram at angles between 67.5° and 28.5° from the hologram surface A for an included angle transmission range of 39° as shown in FIG. 3.

Figure 1:
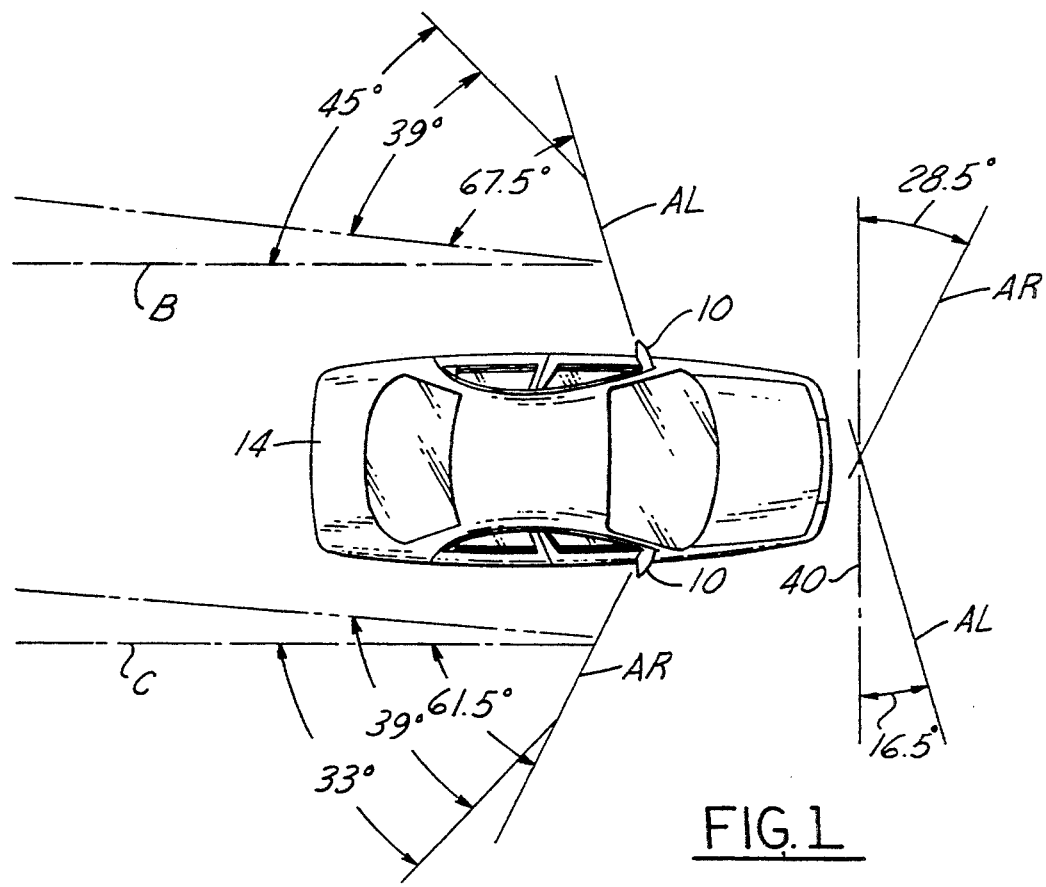
FIG. 1 is a schematic representation of the angles of light projecting from mirrors on a vehicle.
Figure 2:
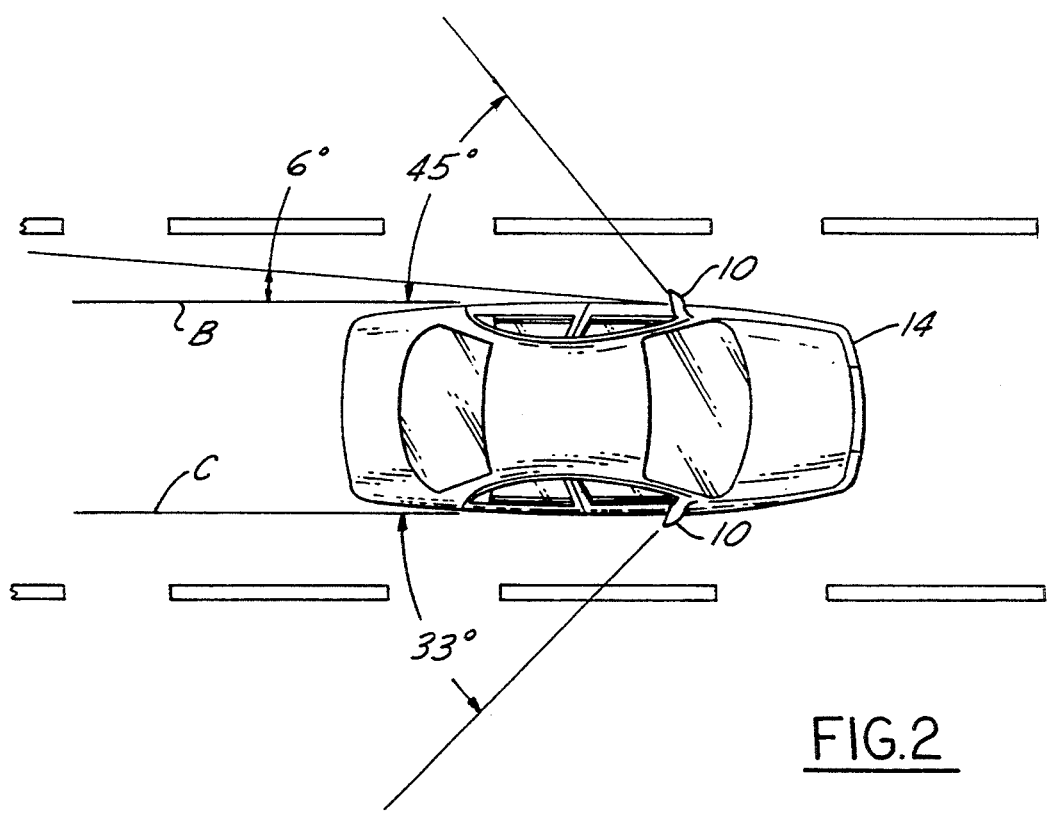
FIG. 2 is a schematic representation of the illumination pattern provided by mirrors on the vehicle.

Rearview mirror surfaces, however, are typically at an angle to a lateral axis 40 of the vehicle. This affects how much of the 37° included angle can be seen by adjacent observers. Light from the holographic signaling mirror assemblies 10 would be visible to operators of adjacent vehicles over a pattern as illustrated in FIG. 2 ranging from 0° to 33° from the right side of the vehicle, and from 6° to 45° from the left side of the vehicle. As best seen in FIG. 1, because of the 28.5° angle of the right hand mirror surface AR to the lateral axis 40 of the vehicle, the projection pattern impinges on the side of the vehicle by approximately 6°. This 6° is effectively lost to vehicle operators behind the vehicle, reducing the effective included angle from 39° to 33°. In FIGS. 1 and 2, lines B and C are representative of the left and right sides of the vehicle respectively.

The left hand mirror surface AL is at 16.5° to the lateral axis of the vehicle 40. The entire 39° of the light from the hologram can thus be seen in a range between 6° from the side of the vehicle to 45° to the side of the vehicle. The angles cited are, of course, merely representative.

Light passing through the hologram is diffused as well as diffracted. The diffusion produces a near uniform intensity of light transmitted by the hologram over an area of the signal. Without the diffusion characteristic, the light would likely appear to be coming from a single light source point. The light then passes through the mirror being colored by the red zone band pass filter coating 36. The light lastly passes through the dichroic mirror, to the field of vision of adjacent vehicle operators.

The hologram 38 allows the placement of a light source within the mirror which serves as a signal to operators of adjacent vehicles without interfering with the driver's use of the mirror to observe the surrounding traffic conditions. This is superior to the use of light baffles blocking the driver's view of the light source as a light source with much lower power requirements can be employed while still providing a signal easily visible to adjacent vehicle operators. Power requirements associated with light baffles have been known to result in more than desired amounts of heat being transferred to the glass case 20 and other supporting members. The holographic signaling mirror of the present invention provides a highly effective signaling device requiring a minimum of power.

Additionally, the low weight of the hologram minimizes vibration problems of the mirror associated with excessive mass.

The invention may be further developed within the scope of the following claims. Accordingly, the above specification is to be interpreted as illustrative of only a single operative embodiment of the present invention.

I claim:

1. A signaling mirror assembly for an exterior of a motor vehicle comprising:
    a mirror shell adapted for mounting to a side of a vehicle body having a rear facing aperture;
    a semi-transparent mirror mounted to the shell and generally closing the aperture of the mirror shell and having a reflectivity characteristic reflecting up to 70% of the visible spectrum of light and having a transmissivity characteristic allowing a transmission of at least 40% of a selected frequency band of the visible spectrum of light therethrough;
    a light source mounted within the mirror shell and being operably illuminated in response to an input voltage signal; and
    a diffractive element disposed between the light source and the mirror and configured to divert entirely by diffraction light from the light source away from a vehicle operator's view to a viewing pattern generally fanning outward from the side of the vehicle body.

2. A signaling mirror assembly as claimed in claim 1, further comprising filter means for transmitting only a predetermined spectrum of light frequencies, being disposed between the light source and a viewer of the light from the light source.

3. A signaling mirror assembly as claimed in claim 2, wherein the filter means includes a dielectric coating on a surface of the mirror.

4. A signaling mirror system as claimed in claim 1, further comprising a glass case to which the mirror is attached having a light well wherein the light source is removably disposed.

5. A signaling mirror assembly for an exterior of a motor vehicle comprising:
    a mirror shell adapted for mounting to a side of a vehicle body having a rear facing aperture;
    a semi-transparent mirror mounted to the shell and generally closing the aperture of the mirror shell and having a reflectivity characteristic reflecting up to 70% of the visible spectrum of light and having a transmissivity characteristic allowing a transmission of at least 40% of a selected frequency band of the visible spectrum of light therethrough;
    a light source mounted within the mirror shell and being operably illuminated in response to an input voltage signal; and
    a diffractive element disposed between the light source and the mirror and configured both to divert light from the light source away from a vehicle operator's view to a viewing pattern generally fanning outward from the side of the vehicle body and to diffuse light from the light source.

6. A signaling mirror assembly for an exterior of a motor vehicle comprising:
 a mirror shell adapted for mounting to a side of a vehicle body having a rear facing aperture;
 a semi-transparent mirror mounted to the shell and generally closing the aperture of the mirror shell and having a reflectivity characteristic reflecting up to 70% of the visible spectrum of light and having a transmissivity characteristic allowing a transmission of at least 40% of a selected frequency band of the visible spectrum of light therethrough;
 a light source mounted within the mirror shell and being operably illuminated in response to an input voltage signal; and
 a hologram disposed between the light source and the mirror and configured to divert light from the light source away from a vehicle operator's view to a viewing pattern generally fanning outward from the side of the vehicle body.

7. A signaling mirror assembly as claimed in claim 6, wherein the hologram is a thin flexible film adhesively bonded to a side of the mirror disposed toward the light source.

8. A signaling mirror system as claimed in claim 6, further comprising an electric mirror actuator functionally disposed between the mirror shell and a glass case and pivotally positioning the glass case and mirror in response to an input provided by a vehicle operator.

9. A visual signaling apparatus disposed in a mirror mounted to an exterior of a motor vehicle for use by an operator thereof in signaling operation of the vehicle brakes, turn signal, and four-way flashers, the signaling apparatus comprising:
 a mirror shell mounted to a side of the vehicle body defining a chamber and a rear-facing aperture therein;
 a light source mounted within the chamber of the mirror shell;
 a semi-transparent dichroic mirror supported by the mirror shell and substantially occluding the aperture thereof and reflecting at most 70% of the visible light spectrum and substantially transmit at least 40% of a selected frequency band of the visible light spectrum; and
 a light diffracting hologram disposed between the light source and the mirror diverting light emitted by the light source away from the driver for viewing by an observer positioned behind the mirror and beside the vehicle and diffusing the light to provide a near uniform intensity of light over an area of the signal.

10. A visual signaling apparatus as claimed in claim 9, wherein the hologram is a thin flexible film adhesively bonded to a side of the mirror disposed toward the light source.

11. A visual signaling apparatus as claimed in claim 9, further comprising a dielectric coating on the mirror acting as a red band pass filter.

* * * * *